(12) United States Patent
Allen et al.

(10) Patent No.: US 12,429,081 B2
(45) Date of Patent: Sep. 30, 2025

(54) SCREW INSERT AND METHOD OF USING THEREOF

(71) Applicant: Masonite Corporation, Tampa, FL (US)

(72) Inventors: Robert C. Allen, Elburn, IL (US); Race C. Natta, Highland Park, IL (US)

(73) Assignee: Masonite Corporation, Tampa, FL (US)

( * ) Notice: Subject to any disclaimer, the term of this patent is extended or adjusted under 35 U.S.C. 154(b) by 197 days.

(21) Appl. No.: 18/153,112

(22) Filed: Jan. 11, 2023

(65) Prior Publication Data

US 2023/0220864 A1 Jul. 13, 2023

Related U.S. Application Data

(60) Provisional application No. 63/298,686, filed on Jan. 12, 2022.

(51) Int. Cl.
  *F16B 13/12* (2006.01)
  *F16B 13/00* (2006.01)
  *F16B 13/08* (2006.01)

(52) U.S. Cl.
  CPC ........ *F16B 13/0866* (2013.01); *F16B 13/001* (2013.01); *F16B 13/124* (2013.01)

(58) Field of Classification Search
  CPC ....... F16B 13/124; F16B 13/12; F16B 13/001
  USPC ............................. 411/61, 63, 67, 80.1–80.6
  See application file for complete search history.

(56) References Cited

U.S. PATENT DOCUMENTS

| | | | |
|---|---|---|---|
| 349,851 A * | 9/1886 | Lorme | F16B 13/124 411/63 |
| 919,205 A | 4/1909 | Newhall | |
| 1,066,040 A * | 7/1913 | Osborne | F16B 13/124 411/68 |
| 1,111,749 A * | 9/1914 | Joseph | B21D 5/02 411/61 |
| 1,114,971 A * | 10/1914 | Diefendorf | B21D 5/02 411/61 |
| 2,601,803 A | 7/1952 | Newman | |
| 3,171,321 A | 3/1965 | Fischer | |
| 3,187,620 A | 6/1965 | Fischer | |
| 3,199,398 A | 8/1965 | Weisz | |
| 3,431,813 A * | 3/1969 | Johnson | F16B 13/14 411/61 |
| 3,522,756 A | 8/1970 | Wolff et al. | |
| 3,613,497 A | 10/1971 | Heldermann | |
| 3,789,727 A * | 2/1974 | Moran | F16B 13/061 411/38 |
| 3,916,480 A | 11/1975 | Smith | |

(Continued)

*Primary Examiner* — Flemming Saether
(74) *Attorney, Agent, or Firm* — IceMiller LLP

(57) ABSTRACT

A screw insert configured for repairing a stripped screw hole. The screw insert comprises three elongated prongs each having a distal end and a proximal end. The three elongated prongs are hingedly connected to each other only at the proximal ends thereof. The three elongated prongs are equiangularly spaced from each other so that longitudinal axes thereof are spaced apart. Each of the prongs has an outer surface and an inner surface. The screw insert is transformable from an open configuration to a folded configuration. The longitudinal axes of the prongs are coplanar in the open configuration. The longitudinal axes of the prongs define an acute angle therebetween in the folded configuration.

15 Claims, 16 Drawing Sheets

(56) References Cited

U.S. PATENT DOCUMENTS

| | | | | |
|---|---|---|---|---|
| 3,959,853 | A | * | 6/1976 | Talan ................ F16B 13/04 |
| | | | | 411/548 |
| 4,142,440 | A | | 3/1979 | Schefer |
| 4,235,150 | A | * | 11/1980 | Nony ................ F16B 13/12 |
| | | | | 411/908 |
| 4,518,291 | A | | 5/1985 | Lang et al. |
| 4,752,170 | A | | 6/1988 | McSherry et al. |
| 5,145,301 | A | | 9/1992 | Yamamoto |
| 5,603,593 | A | | 2/1997 | Fischer et al. |
| 5,791,845 | A | * | 8/1998 | Fulop ................ F16B 13/124 |
| | | | | 411/908 |
| 5,938,385 | A | | 8/1999 | Garfield et al. |
| 10,060,136 | B2 | * | 8/2018 | Milanowski ........ E04F 11/1817 |
| 2002/0176763 | A1 | | 11/2002 | Lin |
| 2019/0154069 | A1 | | 5/2019 | Dill |

* cited by examiner

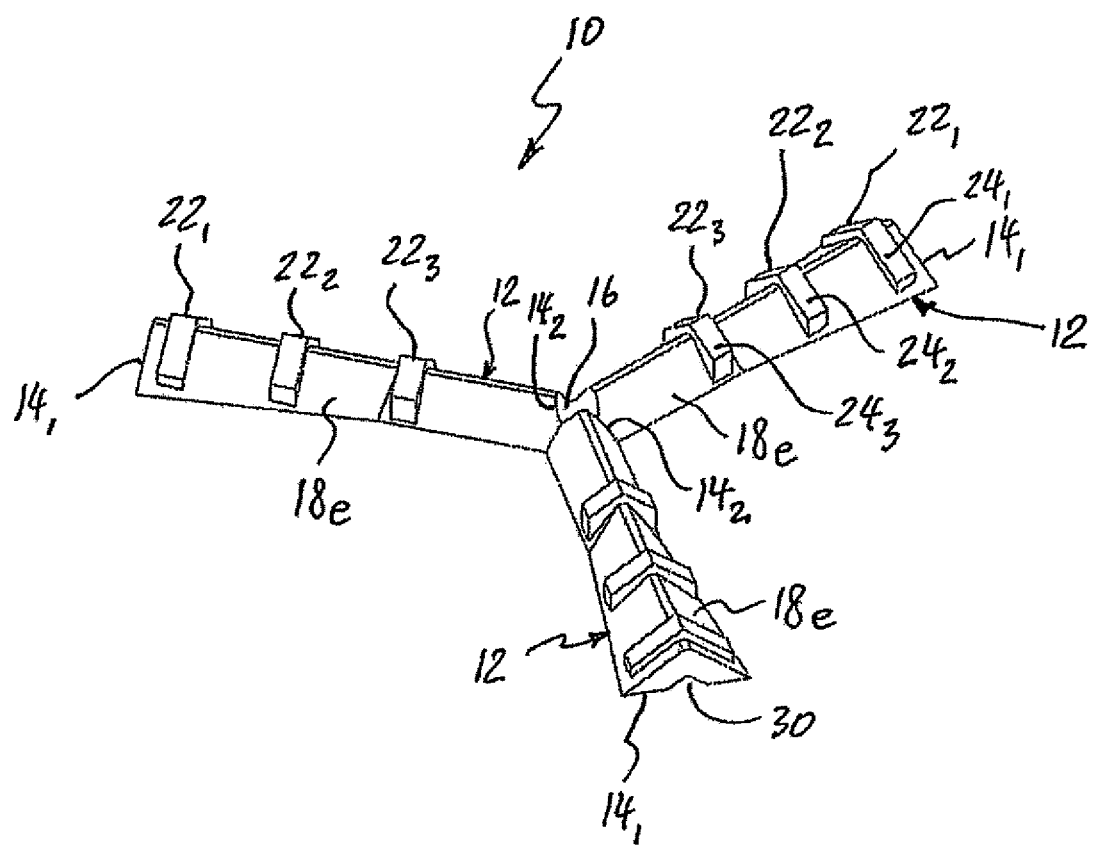

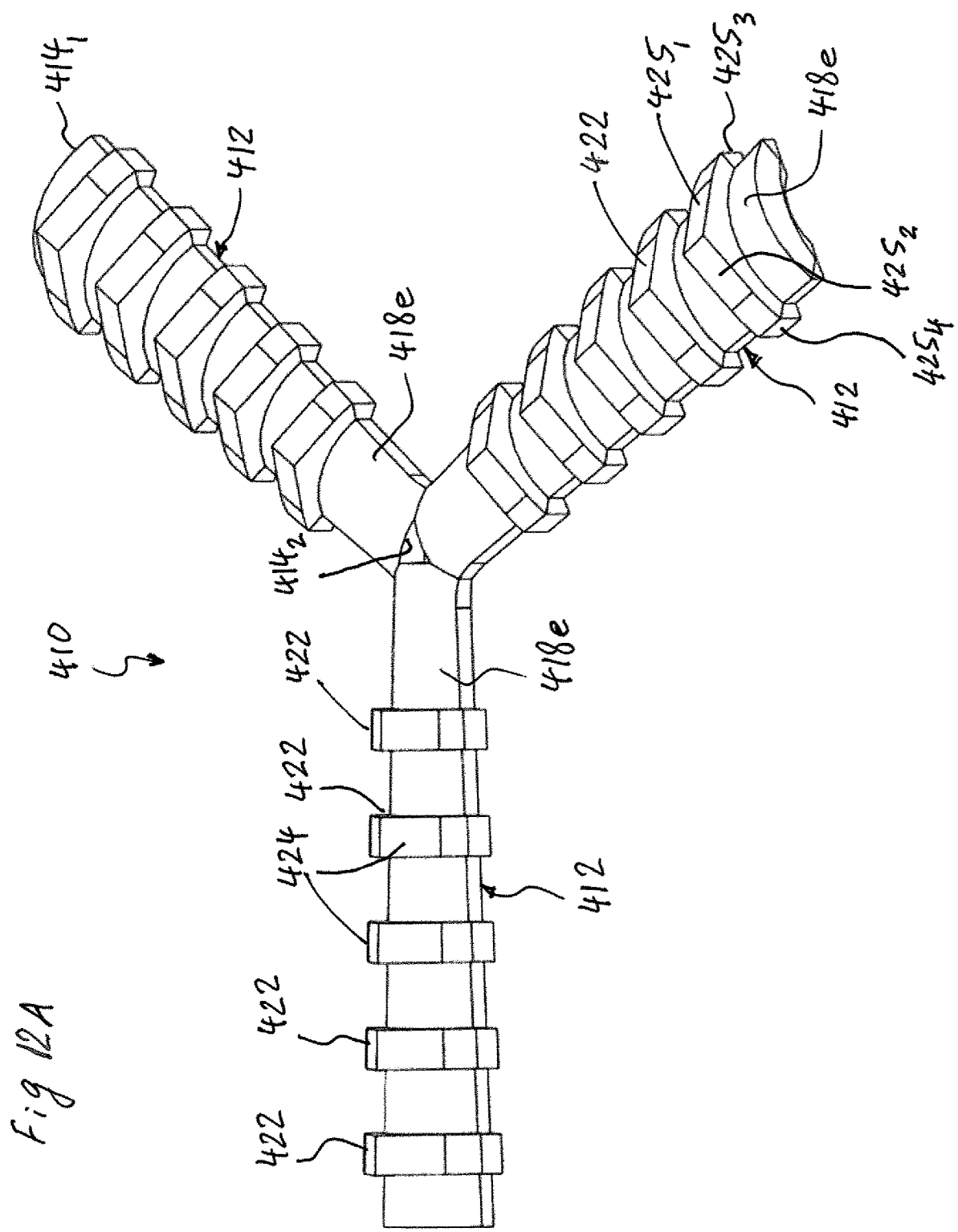

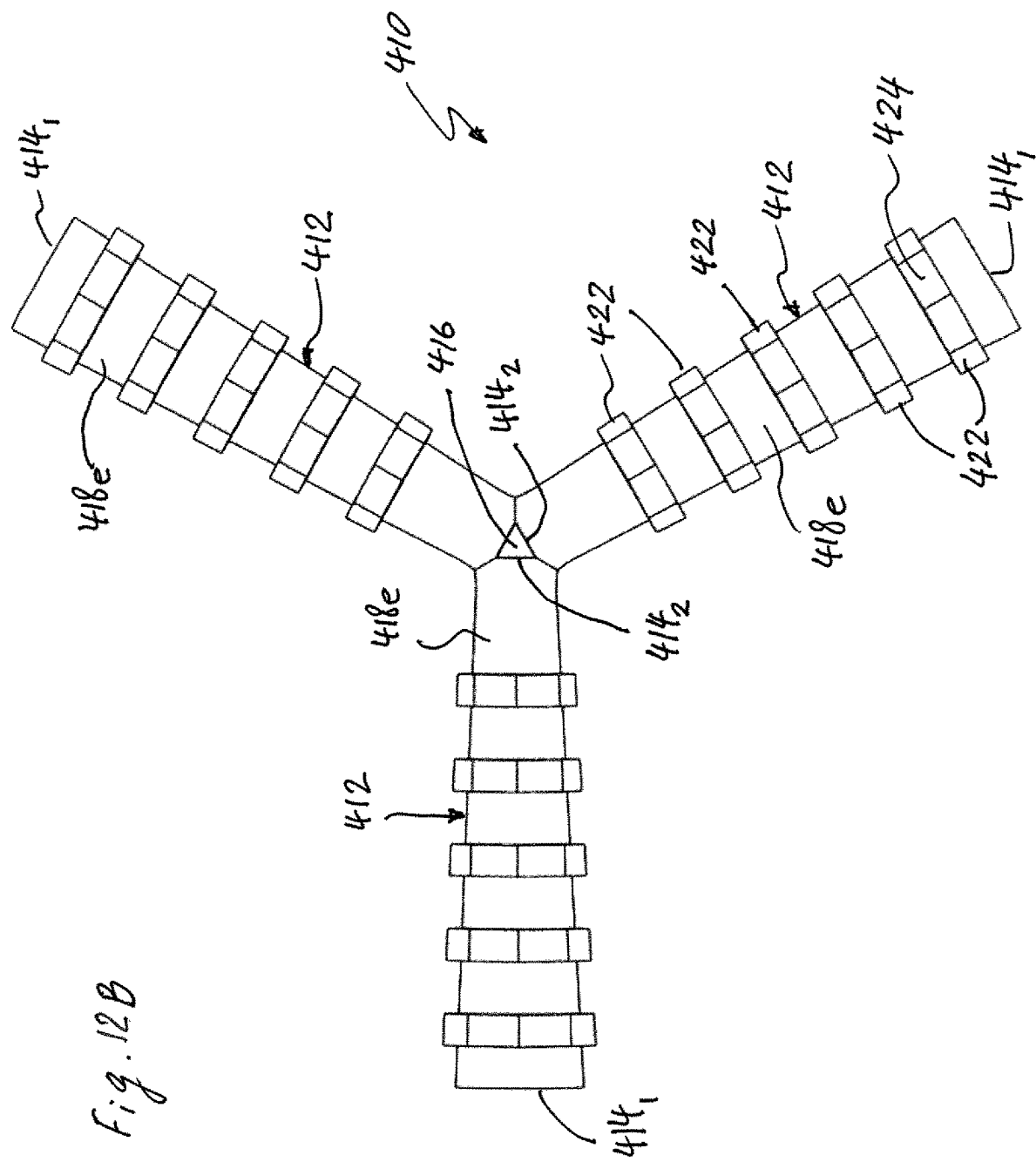

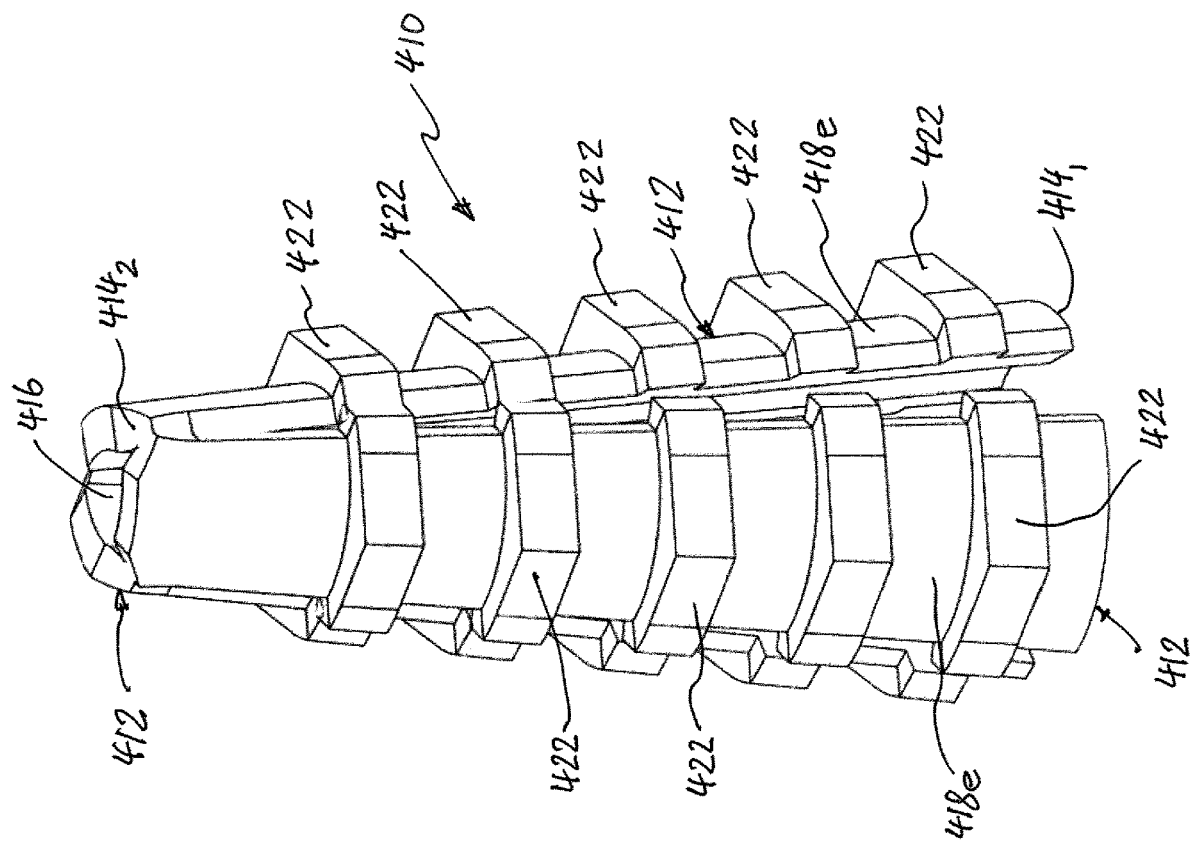

SCREW INSERT AND METHOD OF USING THEREOF

CROSS-REFERENCE TO RELATED APPLICATION AND CLAIM TO PRIORITY

This application claims the benefit of U.S. Provisional Patent Application No. 63/298,686 filed Jan. 12, 2022, by Allen, R. C., which is hereby incorporated herein by reference in its entirety and to which priority is claimed.

BACKGROUND OF THE INVENTION

1. Field of the Invention

The present invention is related to plugs or anchors, and more specifically to a screw insert configured to be placed into a stripped screw hole of a door frame or door slab to allow a substitute or replacement screw to be firmly secured in the stripped screw hole. The invention is also directed to methods of use of the screw insert.

2. Description of the Related Art

Existing exterior or interior doors are found everywhere for opening and closing access between two rooms. Typically, door slabs and door frames utilize screws for securing door hinges thereon. Often, screw holes in the wood frames of doors and the door slabs are stripped due to installation errors or wear. In the event the door slab is to be replaced with another door slab, such as during remodeling, the screw hole may become stripped and installation of the replacement door slab made more difficult.

Therefore, a need exists for a screw insert configured to be placed into a stripped screw hole to allow a substitute or replacement screw better purchase in the stripped screw hole.

BRIEF SUMMARY OF THE INVENTION

According to a first aspect of the present invention, a screw insert is provided for repairing a stripped screw hole. The screw insert comprises three elongated prongs each having a distal end and a proximal end. The three elongated prongs are hingedly connected to each other only at the proximal ends thereof. The three elongated prongs are equiangularly spaced from each other, so that longitudinal axes thereof are spaced apart. Each of the prongs has an outer surface and an inner surface. The screw insert is transformable from an open configuration to a folded configuration, and the inner surfaces of the prongs are coplanar when in the open configuration. The longitudinal axes of the prongs define an acute angle therebetween when in the folded configuration.

According to a second aspect of the present invention, a method of using a screw insert to repair a stripped screw hole is disclosed. The screw insert comprises three elongated prongs, each prong having a distal end and a proximal end. The three elongated prongs are hingedly connected to each other only at the proximal ends. The three elongated prongs are equiangularly spaced from each other so that longitudinal axes thereof are spaced from each other by 120°. Each of the prongs has an outer surface and a inner surface. The screw insert is manually transformable from an open configuration to a folded configuration, and the longitudinal axis of the prongs are coplanar when in the open configuration. The longitudinal axes of the prongs define an acute angle therebetween when in the folded configuration. The method comprises the steps of folding the prongs of the screw insert together from the flat configuration into the folded configuration, placing the folded screw insert into a screw hole in one of a jamb of a door frame or a door slab, inserting a screw into the screw insert between the prongs when the screw insert is installed in a screw hole of a leave of a door hinge, and turning the screw, such as with a screwdriver, so as to force the prongs radially outwardly against the screw hole as the screw advances longitudinally into the insert.

According to a third aspect of the present invention, an entryway is provided. The entryway comprises a door frame, a door slab pivotally mounted on the door frame by door hinges, and a screw insert disposed in a screw hole in one of a jamb of the door frame or the door slab so that one of leaves of the door hinge is securely attached to one of the jamb of the door frame or the door slab by a screw engaging the screw insert. The screw insert comprises three elongated prongs, each prong having a distal end and a proximal end. The three elongated prongs are hingedly connected to each other only at their proximal ends. The three elongated prongs are equiangularly spaced from each other so that longitudinal axes thereof are spaced from each other by 120°. Each of the prongs has an outer surface and an inner surface. The screw insert manually transformable from an open configuration to a folded configuration. The longitudinal axes of the prongs are coplanar when in the open configuration. The longitudinal axes of the prongs define an acute angle therebetween when in the folded configuration.

Other aspects of the invention, including system, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 3 is a perspective view of the screw insert in the flat configuration;

FIG. 12A is a perspective view of a screw insert according to a fifth exemplary embodiment of the present invention in a flat configuration;

FIG. 12B is a top view of the screw insert according to the fifth exemplary embodiment in the flat configuration;

FIG. 13B is a perspective view from the bottom of the screw insert according to the fifth exemplary embodiment of the present invention in the folded configuration.

DETAILED DESCRIPTION OF EXEMPLARY EMBODIMENTS

Figure 1A:
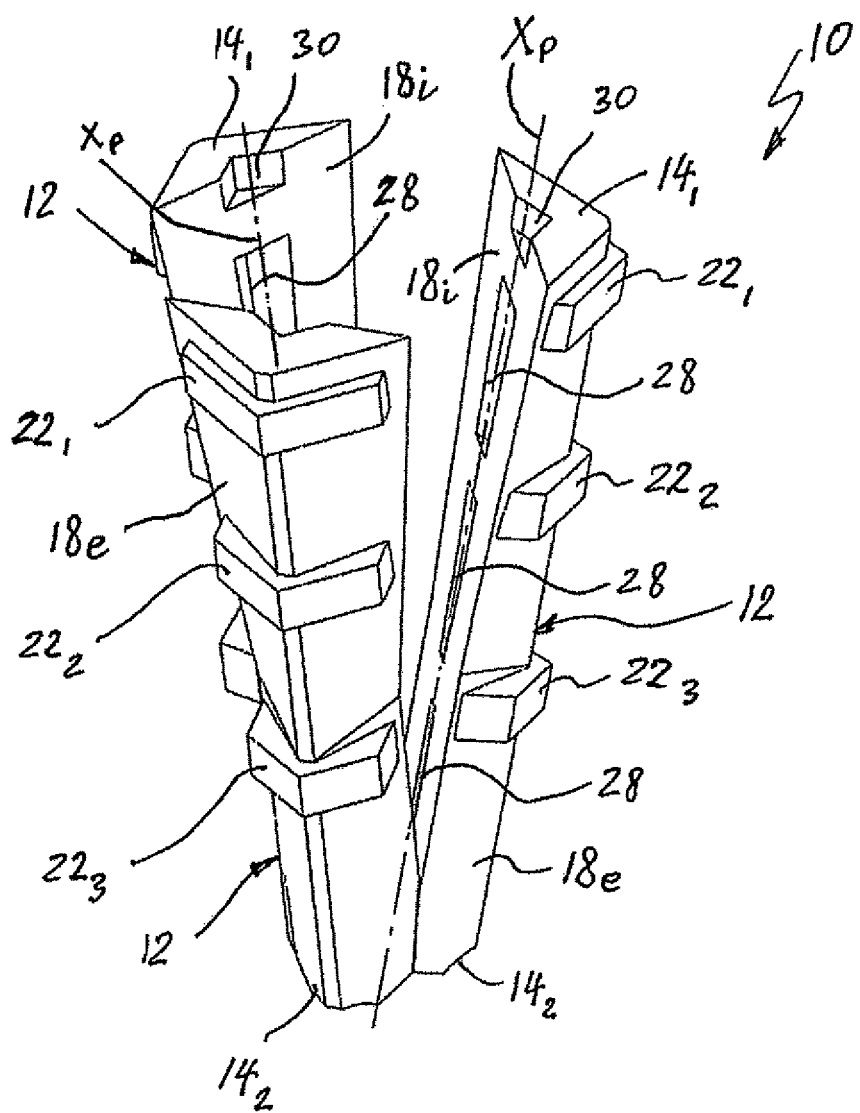
FIG. 1A is a perspective view from the top of a screw insert according to a first exemplary embodiment of the present invention in a folded configuration.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

FIGS. 1A-3 depict a screw insert 10 according to a first exemplary embodiment of the present invention. The screw insert 10 is configured to be placed into a stripped screw hole to allow a substitute or replacement screw to be firmly secured in the stripped screw hole, i.e., to repair the stripped screw hole so that it may receive the substitute/replacement screw. Screw holes, especially screw holes in wood such as used in doors and door frames, may become stripped when the fibers around the hole deteriorate or when the wood fibers around the screw threads have torn away for some reason. This could be from overscrewing, putting too much weight on the screw, or expansion and contraction from the weather. Stripped screw holes can make wood doors bind or sag and handles rattle loose because screws stop holding or have reduced holding within the wood of the slab/frame. Screwed joints get their strength because of the way the threads wedge themselves into the wood fibers. If wear-and-tear or sudden stress on the joint causes the wood fibers to tear free, the result may be a failed connection.

The screw insert 10 is preferably made of a plastic material, such as by injection molding, or metal, such as by casting or stamping. The screw insert 10 is formed initially in a flat (or open) configuration, as shown in FIGS. 2 and 3. The screw insert 10 comprises three structurally and geometrically identical elongated prongs (or legs) 12 hingedly (i.e., pivotally) connected to each other. The prongs 12 of the screw insert 10 are configured to be folded together to allow positioning in a stripped screw hole. Accordingly, due to the material of construction and the interconnected, foldable prongs 12, the screw insert 10 may be transformed from the flat (or open) configuration (shown in FIGS. 2 and 3) to a folded configuration (shown in FIGS. 1A and 1B). The screw insert 10 may be shipped in the flat configuration and can be manually folded together (assembled) into the folded configuration when needed.

Each of the prongs 12 has a first (or distal) end $14_1$ and a second (or proximal) end $14_2$. As best shown in FIG. 2, each of the prongs 12 has a longitudinal axis $X_P$ extending between its distal end $14_1$ and the remote proximal end $14_2$ of the associated prong 12. The prongs 12 are pivotally connected to each other only at the proximal ends $14_2$ by virtue of the plastic material of manufacture of the insert 10 (or metal if manufactured from a metal). Moreover, the proximal ends $14_2$ of the interconnected prongs 12 define a through center opening 16 therebetween, best shown in FIGS. 2 and 3.

Each of the prongs 12 has an external (or outer) surface 18e and an internal (or inner) surface 18i. The inner surface 18i may be flat or rounded. The longitudinal axes of the prongs 12 are coplanar when in the flat configuration, and the longitudinal axes $X_P$ of the prongs 12 define an angle 120° therebetween, as best shown in FIGS. 2 and 3. In other words, when in the flat configuration, the prongs 12 are equiangularly spaced from each other. When in the folded configuration, the longitudinal axes $X_P$ of the prongs 12 define an acute angle therebetween, as best shown in FIGS. 1A and 1B.

Moreover, each of the prongs 12 has an external portion $20_1$ adjacent to the distal end $14_1$ of the associated prong 12, and an inner portion $20_2$ adjacent to the associated proximal end $14_2$. As best shown in FIG. 2, the inner portion $20_2$ has a length $M_2$ in the direction of the longitudinal axis $X_P$ and a constant width $K_2$. The external portion $20_1$ has a preferably trapezoidal shape having a length $M_1$ in the direction of the longitudinal axis $X_P$ and a width varying between $K_1$ (width of the prong 12 in the direction perpendicular to the longitudinal axis $X_P$ at the distal end $14_1$ of the prong 12) and $K_2$ (width of the inner portion $20_2$ of the prong 12 in the direction perpendicular to the longitudinal axis $X_P$), wherein $K_1 > K_2$ and $M_1 > M_2$, as best shown in FIG. 2.

One or more teeth (or ribs) $22_1$, $22_2$ and $22_3$ are disposed in spaced relation along the outer surface $18e$ of each of the prongs 12 between the distal end $14_1$ and the proximal end $14_2$ of the prong 12. Each tooth $22_1$ is formed adjacent to the distal end $14_1$ of the prong 12, while the tooth $22_3$ is formed adjacent to the proximal end $14_2$. The tooth $22_2$ is intermediate the teeth $22_1$ and $22_3$. Each of the teeth $22_1$, $22_2$ and $22_3$ has an outer tooth surface $24_1$, $24_2$ and $24_3$, respectively. As best shown in FIGS. 1A, 1B and 3, the outer tooth surface $24_1$ of each of the prongs 12 is parallel to or oriented at an acute angle $\delta_1$ to the associated outer surface $18e$, while the outer tooth surfaces $24_2$ and $24_3$ of each of the prongs 12 are oriented at an acute angle $\delta_2$ and $\delta_3$, respectively, to the associated outer surface $18e$, best shown in FIG. 1B. As shown in FIGS. 1A, 1B and 3, the relationship between the angles $\delta 1$, $\delta_2$ and $\delta_3$ is as follows: $\delta 1 < \delta_2 < \delta_3$, wherein the angle $\delta_1 \geq 0$. Alternatively, at least one rib may be formed in a cylindrical shape on the outer surface $18e$ of each of the prongs 12 so as to extend between the distal end $14_1$ and the proximal end $14_2$ of each prong 12 along the longitudinal axes thereof.

Figure 1B:
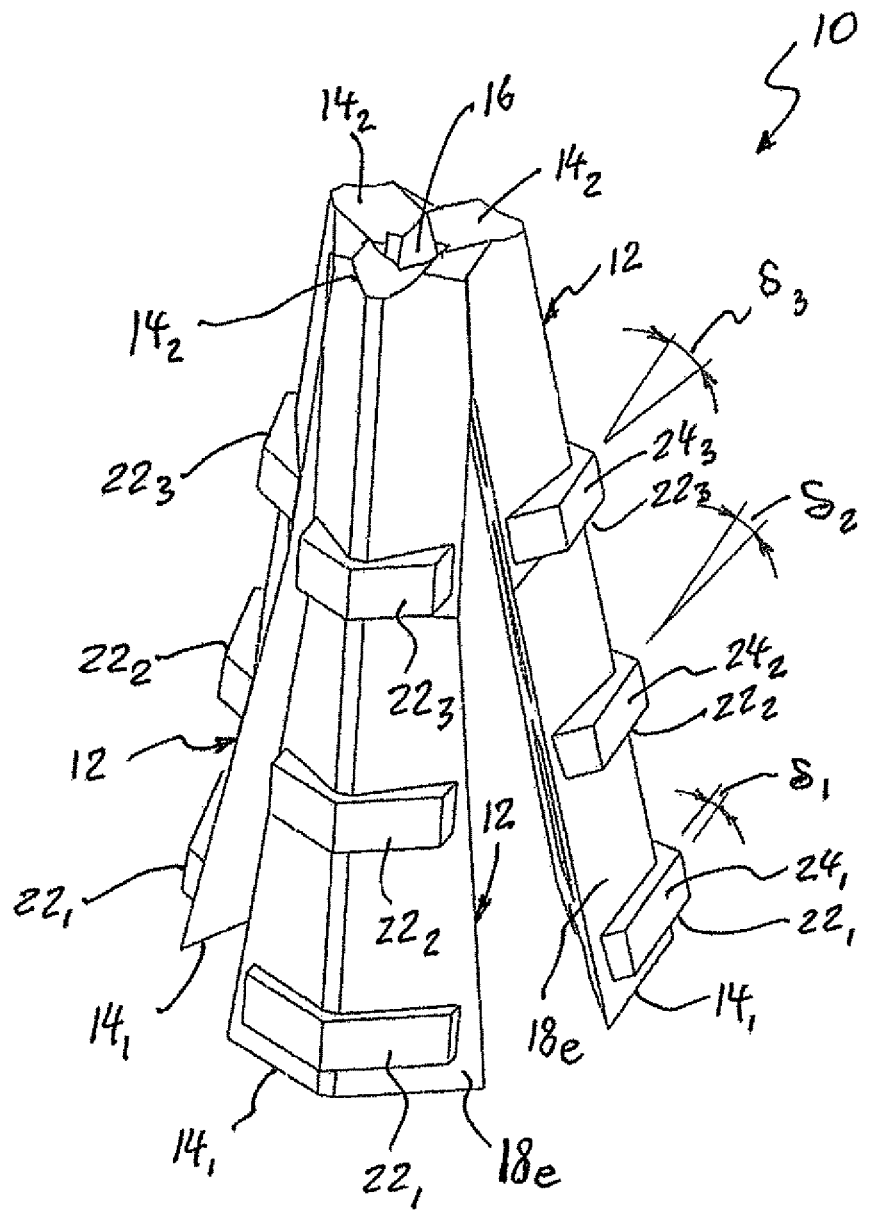
FIG. 1B is a perspective view from the bottom of the screw insert according to the first exemplary embodiment of the present invention in the folded configuration.
Figure 2:
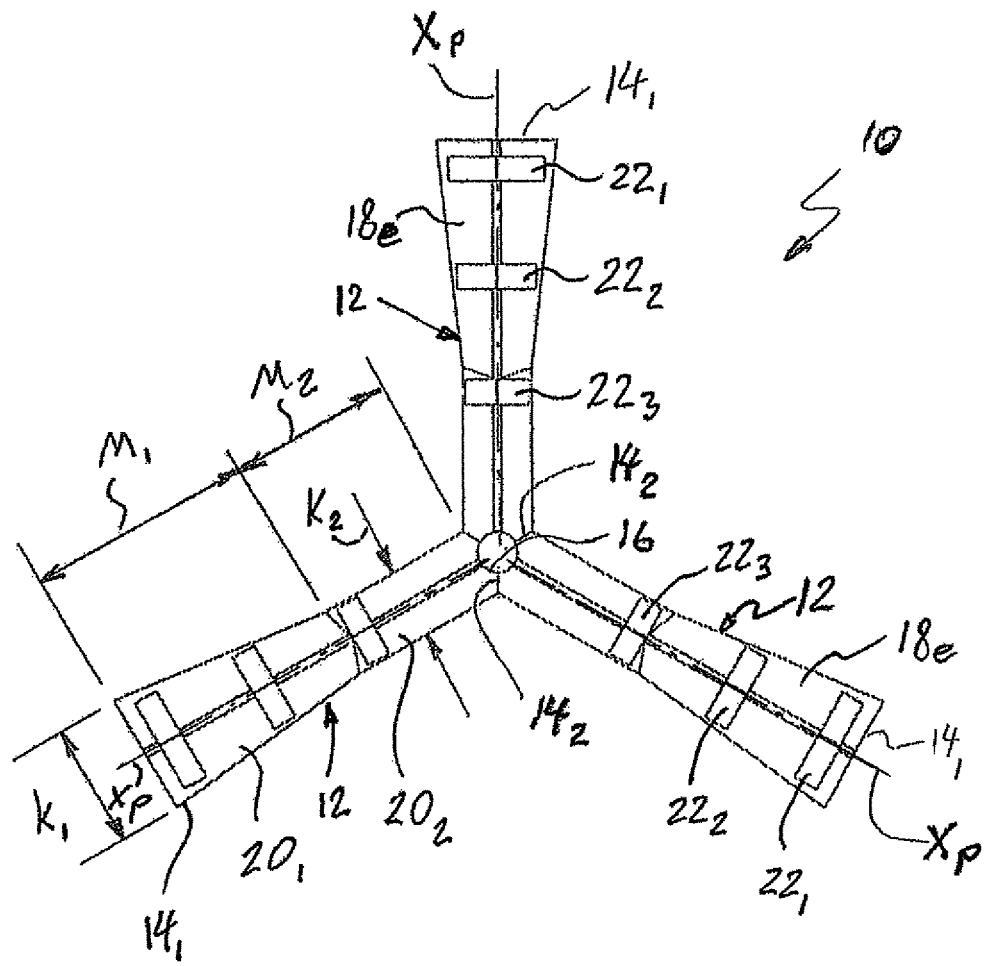
FIG. 2 is a top view of the screw insert in a flat configuration.

As best shown in FIG. 1A, the inner surface $18i$ of each of the prongs 12 is formed with at least one, preferably a plurality of indentations (or notches or grooves) 28, which are spaced from each other along the longitudinal axis $X_P$. Each of the indentations 28 is symmetrical to the longitudinal axis $X_P$ and is formed in the shape of a triangular prism or other shape. The distal end $14_1$ of each of the prongs 12 is formed with an open recess 30, for example a V-shaped recess, open along the longitudinal axis $X_P$ in the direction away from the prong 12, and is closed along the longitudinal axis $X_P$ in the direction from the distal end $14_1$ toward the proximal end $14_2$ of the prong 12, as best shown in FIG. 1A. Accordingly, the open recess 30 is separated from the adjacent indentation 28 (i.e., is not in communication with) by the inner surface $18i$ of the prong 12, as best shown in FIG. 1A. Also, the open recess 30 is open in a direction perpendicular to the longitudinal axis $X_P$ only on the inner surface $18i$ of the associated prong 12, as best shown in FIG. 1A. The open V-shaped recess 30 provides a location for seating or locating a screw during use of insert 10. The open recess 30 is symmetrical to the longitudinal axis $X_P$.

A method of using the screw insert 10 in a door frame is as follows.

Figure 4A:
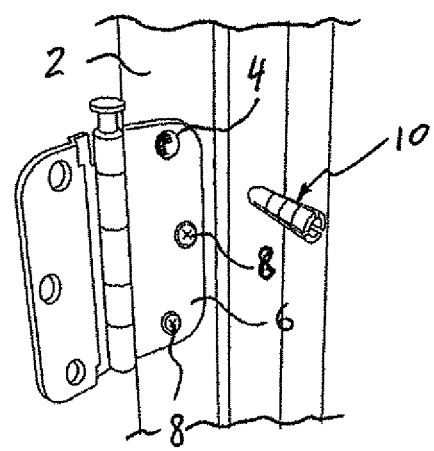
FIG. 4A is a perspective view showing the screw insert prior to be inserted into a stripped screw hole in a jamb of a door frame.
Figure 4B:
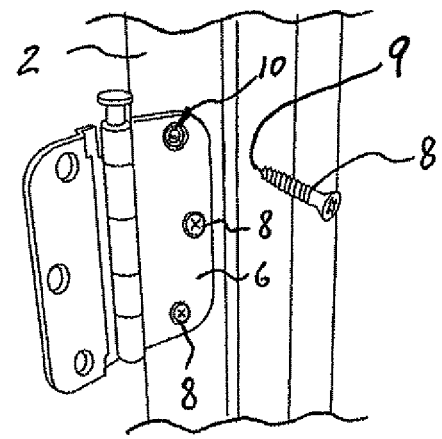
FIG. 4B is a perspective view showing the screw insert placed into the stripped screw hole in the jamb of the door frame.

In the event a screw hole has become stripped, the screw insert 10 may be used to allow secure placement of a substitute or replacement screw. In that event, the screw insert 10 is prepared for use, and the prongs 12 of the screw insert 10 are manually folded together, as shown in FIG. 4A, i.e., the screw insert 10 is transformed from the flat configuration of FIG. 2 into the folded configuration of FIG. 1A. Then, the folded screw insert 10 is placed into a stripped screw hole 4 in a jamb 2 of the door frame, as shown in FIG. 4B, prior to a screw 8 being inserted therein. The jamb 2 of the door frame is typically made of wood, and thus the insert 10 allows the periphery of the stripped screw hole 4 to be gripped securely. Should the stripped screw hole 4 be too small for the folded insert 10, one of the prongs 12 may be severed, such as by using scissors or a knife, in order to reduce the size and allow placement into the screw hole. After being folded into the folded configuration, the screw insert 10 is placed into the stripped screw hole 4, as shown in FIG. 4B. If necessary, the screw insert 10 may be advanced into the screw hole, such as by use of a hammer. A door hinge is then put into position so that the screw hole opening in a hinge leaf 6 is positioned in alignment with the screw insert 10. The screw 8 is then inserted through the hinge screw hole opening in the hinge leaf 6 into the screw insert 10 between the prongs 12, so that screw point 9 of screw 8 extends through the center opening 16 created by the folded together prongs 12. The screw 8 is then turned, such as with a screw driver, and the prongs 12 are thus forced radially outwardly against the stripped screw hole 4 as the screw 8 advances longitudinally into and engages the insert 10. Those skilled in the art recognize that the shank of a wood screw 8 typically has an outer diameter that increases from the screw point to the screw head. Thus, advancement of the screw 8 into insert 10 progressively forces the prongs 12 radially outwardly. While being longitudinally advanced, the screw 8 penetrates the notches 28. As the screw insert 10 is expanded by the advancing screw 8, the teeth $22_1$, $22_2$ and $22_3$ firmly engage the wood material of the stripped screw hole 4. The screw 8 and the screw insert 10 thus fill the area which had been stripped, utilizing the pressure of the tapered screw shank. As a result, one of leaves 6 of a door hinge may be securely attached to the jamb 2 of the door frame. If multiple screw holes 4 are stripped, then multiple inserts 10 may be utilized.

Current anchors require the stripped screw hole to be drilled larger to fit the anchor to be inserted into it. The screw insert of the present invention fits in the stripped screw hole or slightly oversize hole without having to increase the size of the stripped screw hole into which it is to be inserted, and thus makes use and installation of a replacement door easier, especially for the DIY installer. The tapered shape of the insert 10, when folded, helps with insertion into relatively small screw holes. Furthermore, the folded prongs 12 of the insert 10, due to the material of manufacture, tend to spring back into the open or non-folded configuration, which helps hold the insert 10 in larger screw holes.

Should the screw hole in a door slab become stripped, then a method of using the screw insert 10 in a door slab 3 is as follows.

Figure 5A:
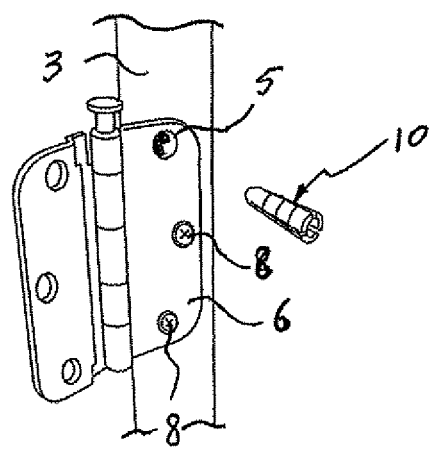
FIG. 5A is a perspective view showing the screw insert prior to be inserted into a stripped screw hole in a door slab.
Figure 5B:
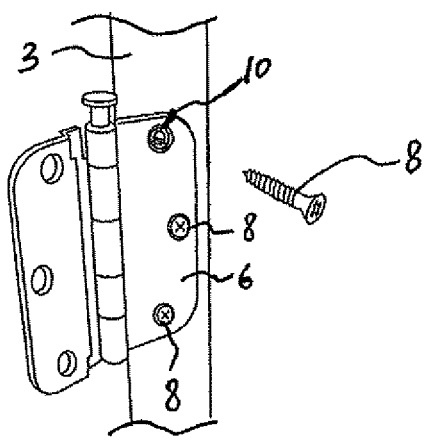
FIG. 5B is a perspective view showing the screw insert placed into the stripped screw hole in the door slab.

First, when being prepared for use, the prongs 12 of the screw insert 10 are manually folded together as shown in FIG. 5A, i.e., the screw insert 10 is transformed from the flat configuration of FIG. 2 into the folded configuration of FIG. 1A. Then, the folded screw insert 10 is placed into a stripped screw hole 5 in the door slab 3 or door stile that forms the frame of the door, as shown in FIG. 5B, prior to a screw 8 being inserted therein. Door stiles of the door slab 3 are typically made of wood, and thus the insert 10 allows the periphery of the stripped screw hole 5 to be gripped securely. Should the stripped screw hole 5 be too small for the folded insert 10, one of the prongs 12 may be severed, such as with scissors or a knife. After being folded into the folded configuration, the screw insert 10 is inserted into the stripped screw hole 5, as shown in FIG. 5B. The hinge leaf 6 is then aligned on the slab 3 so to screw hole in the leaf 6 is aligned with the screw insert 10 in the screw hole 5. The screw 8 is inserted into screw hole of the hinge leaf 6 and then into the screw insert 10 between the prongs 12, so that a screw point 9 extends through the center opening 16 created by the folded together prongs 12. The screw 8 is then turned, and the prongs 12 are forced radially outwardly against the stripped screw hole 5 as the screw 8 advances longitudinally into and engages the insert 10. Those skilled in the art recognize that a wood screw 8 typically has a screw shank that has a diameter increasing from the screw point to the screw head. While being longitudinally advanced into the insert 10, the screw 8 penetrates the notches 28. As the screw insert 10 is expanded, the teeth $22_1$, $22_2$ and $22_3$ firmly engage the wood material of the stripped screw hole 5. The screw 8 and the screw insert 10 thus fill the area which had been stripped, utilizing the pressure resulting from the tapered screw shank. As a result, one of leaves 6 of a door hinge is securely attached to the door slab 3. Should other screw holes in the hinge or in any of the other hinges be stripped, then additional screw inserts may be used.

Those skilled in the art recognize that doors typically are mounted within a door frame through use of multiple hinges, frequently three hinges, and the leaves of each hinge typically have multiple screw holes. As a result, multiple screw inserts 10 may be required for installation of a new or replacement door.

Various modifications, changes, and alterations may be practiced with the above-described embodiment, including but not limited to the additional embodiments shown in FIGS. 6-13B. In the interest of brevity, reference characters in FIGS. 6-13B that are discussed below in connection with the first exemplary embodiment of in FIGS. 1A-5 are not further elaborated upon below, except to the extent necessary or useful to explain the additional embodiments of FIGS. 6-13B. Modified components and parts are indicated by the addition of a hundred digits to the reference numerals of the components or parts.

Figure 6:
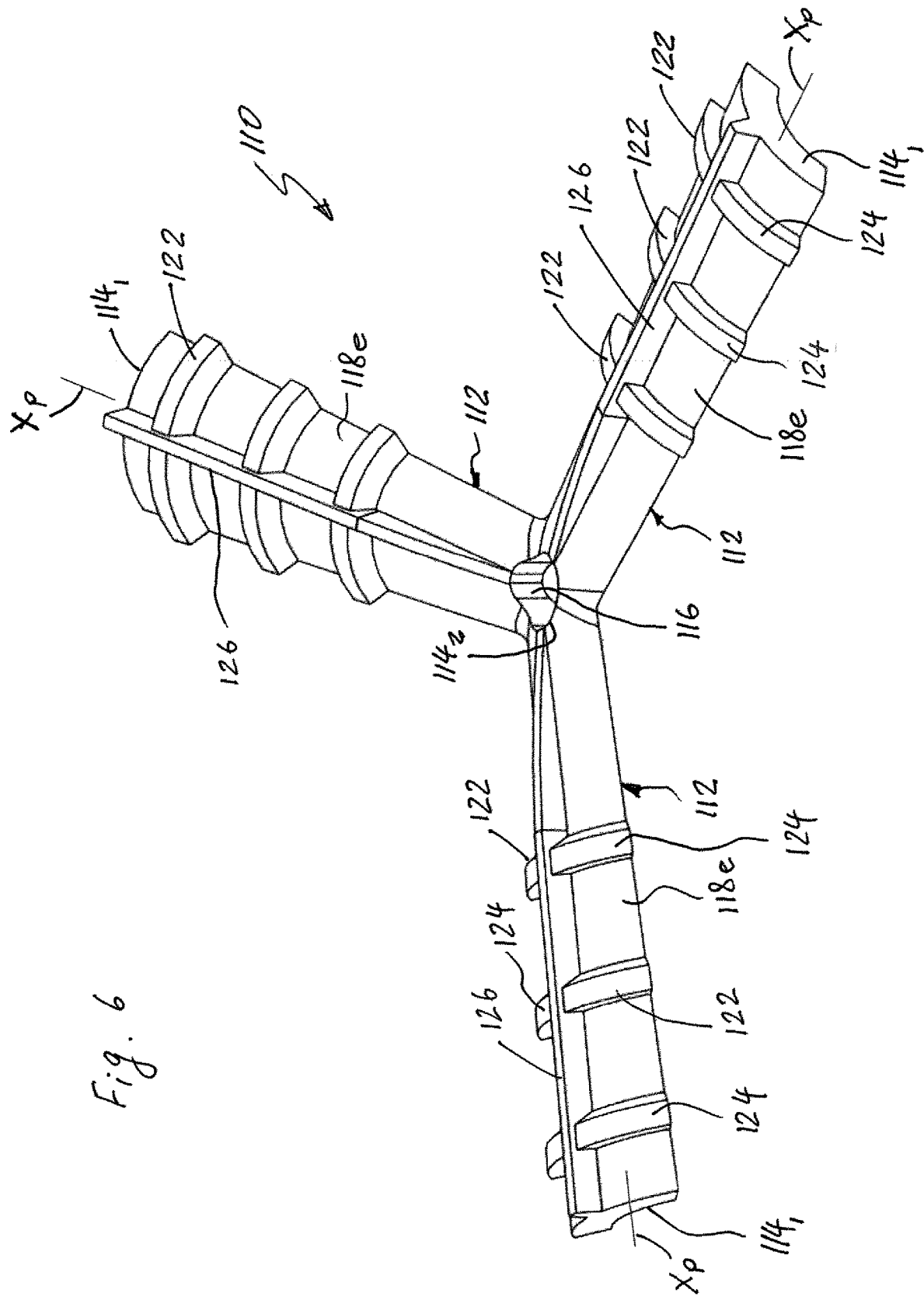
FIG. 6 is a perspective view from the top of a screw insert according to a second exemplary embodiment of the present invention in a flat configuration.
Figure 7:
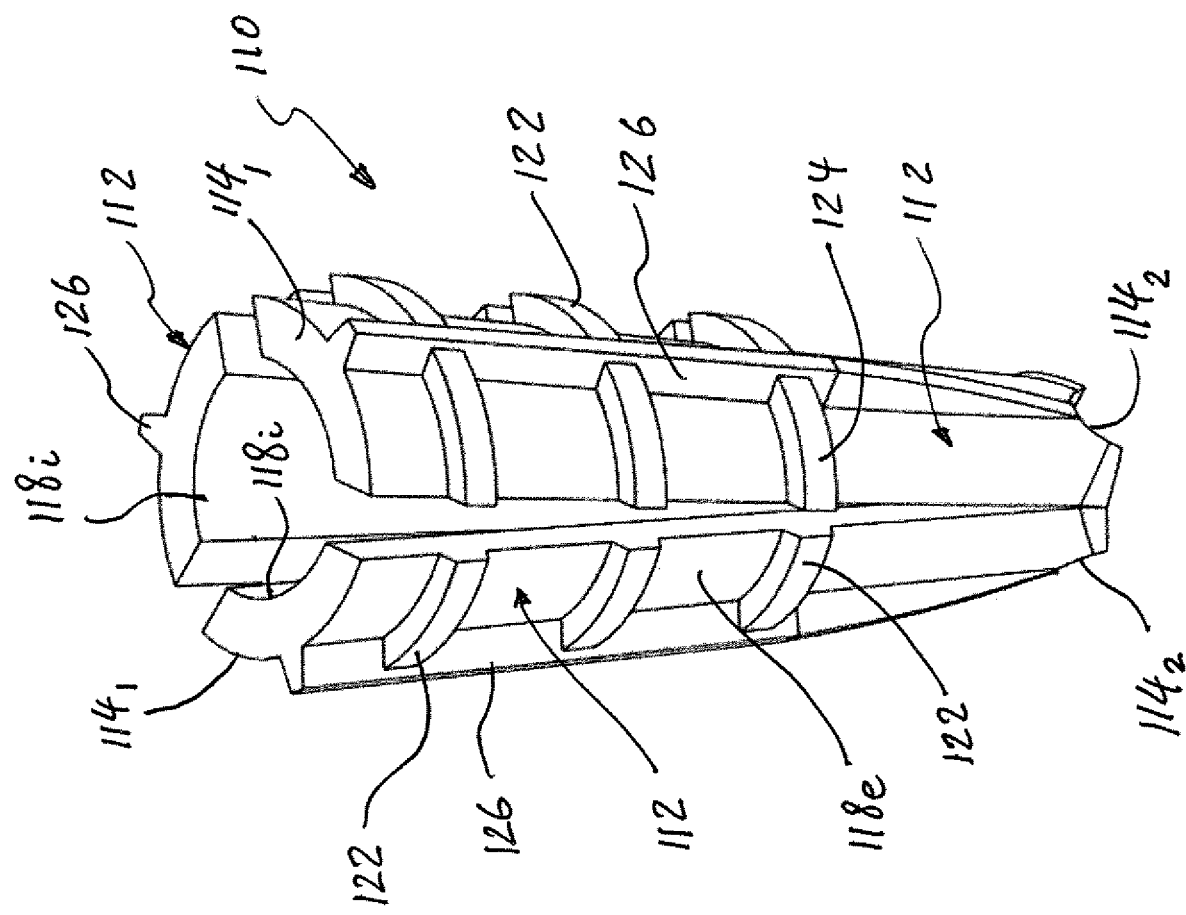
FIG. 7 is a perspective view from the top of a screw insert according to the second exemplary embodiment of the present invention in a folded configuration.

FIGS. 6 and 7 depict a screw insert 110 according to a second exemplary embodiment of the present invention. The screw insert 110 is preferably made of a plastic material, such as by injection molding, or metal, such as by casting or stamping. The screw insert 110 is formed initially in a flat (or open) configuration, as shown in FIG. 6. The screw insert 110 comprises three structurally and geometrically identical elongated prongs (or legs) 112 hingedly (i.e., pivotally) connected to each other. The prongs 112 of the screw insert 110 are configured to be folded together to allow positioning in a stripped screw hole. Accordingly, due to the material of construction and the interconnected, foldable prongs 112, the screw insert 110 may be transformed from the flat (or open) configuration (shown in FIG. 6) to a folded configuration (shown in FIG. 7). The screw insert 110 may be shipped in the flat configuration and can be manually folded together (assembled) into the folded configuration when needed.

Each of the prongs 112 has a first (or distal) end $114_1$ and a second (or proximal) end $114_2$. As best shown in FIG. 6, each of the prongs 112 has a longitudinal axis $X_P$ extending between its distal end $114_1$ and the remote proximal end $114_2$ of the associated prong 112. The prongs 112 are pivotally connected to each other only at the proximal ends $114_2$ by virtue of the plastic material of manufacture of the insert 110 (or metal if manufactured from a metal). Moreover, the proximal ends $114_2$ of the interconnected prongs 112 define a through center opening 116 therebetween, best shown in FIG. 6.

Each of the prongs 112 has an external (or outer) surface 118e and an internal (or inner) surface 118i. Both the outer surface 118e and the inner surface 118i are cylindrical relative to the longitudinal axes of the prongs 112.

The longitudinal axes $X_P$ of the prongs 112 are coplanar when in the flat configuration, and the longitudinal axes $X_P$ of the prongs 112 define an angle 120° therebetween, as best shown in FIG. 7. In other words, when in the flat configuration, the prongs 112 are equiangularly spaced from each other. When in the folded configuration, the longitudinal axes $X_P$ of the prongs 112 define an acute angle therebetween, as best shown in FIG. 7.

One or more teeth (or ribs) 122 are disposed in spaced relation along the outer surface 118e of each of the prongs 112 between the distal end $114_1$ and the proximal end $114_2$ of the prong 112, and is orthogonal to the longitudinal axes $X_P$ of the prongs 112. Each of the teeth 122 has an outer cylindrical circumferential tooth surface 124. Moreover, each of the prongs 112 has a central longitudinal rib 126 integrally formed on the outer surface 118e of each of the prongs 112 so as to extend between the distal end $114_1$ and the proximal end $114_2$ of each prong 112 along (i.e., parallel to) the longitudinal axes thereof. As shown in FIGS. 6 and 7, the central rib 126 extends through the teeth 122. It can be noted in FIG. 6 that the rib 126 extends outwardly from prong 112 by a distance exceeding the distance ribs 122 extend from prong 112, thus allowing easier insertion of insert 112 into a screw hole.

Figure 8:
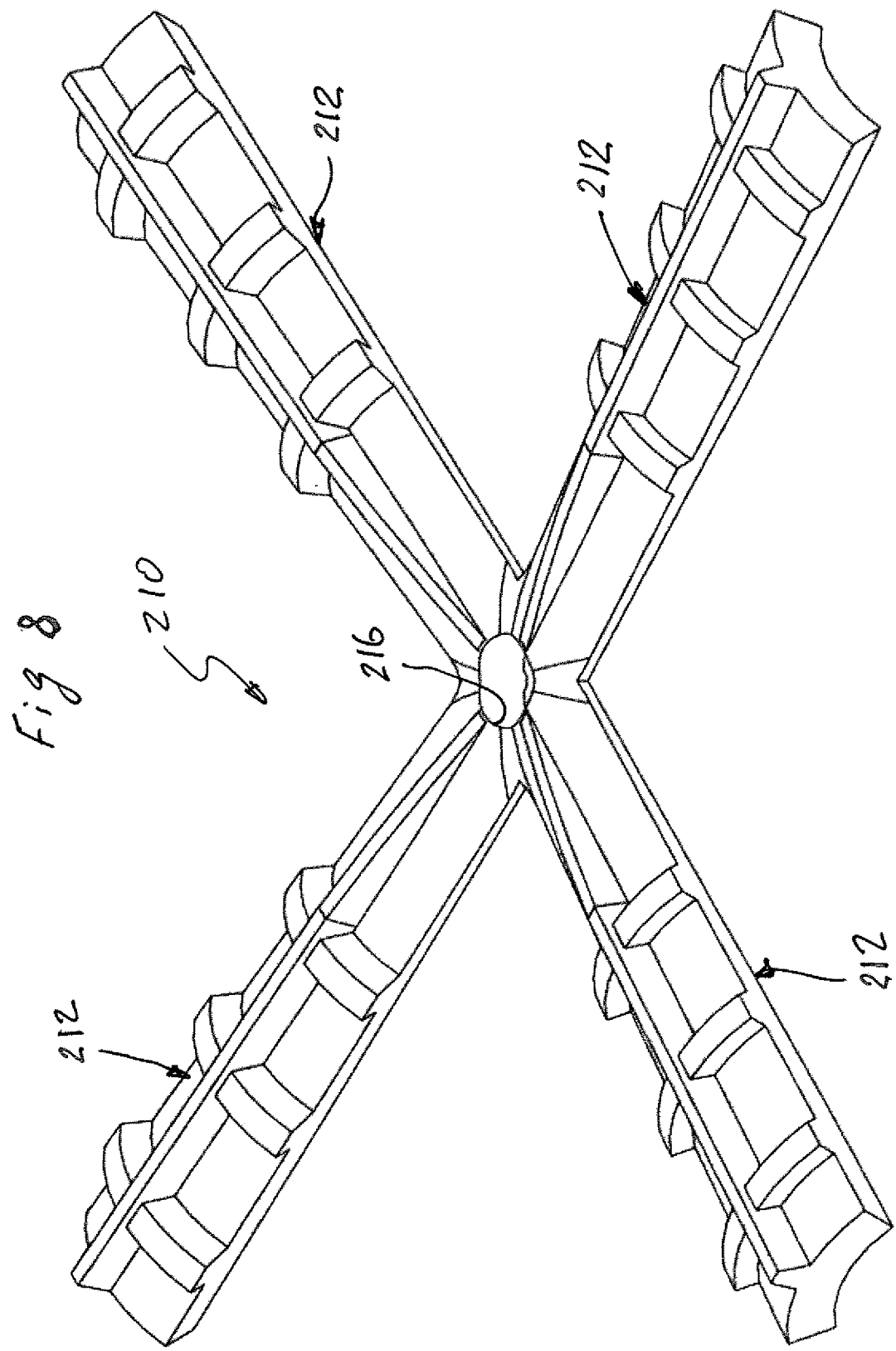
FIG. 8 is a perspective view from the top of a screw insert according to a third exemplary embodiment of the present invention in a flat configuration.
Figure 9:
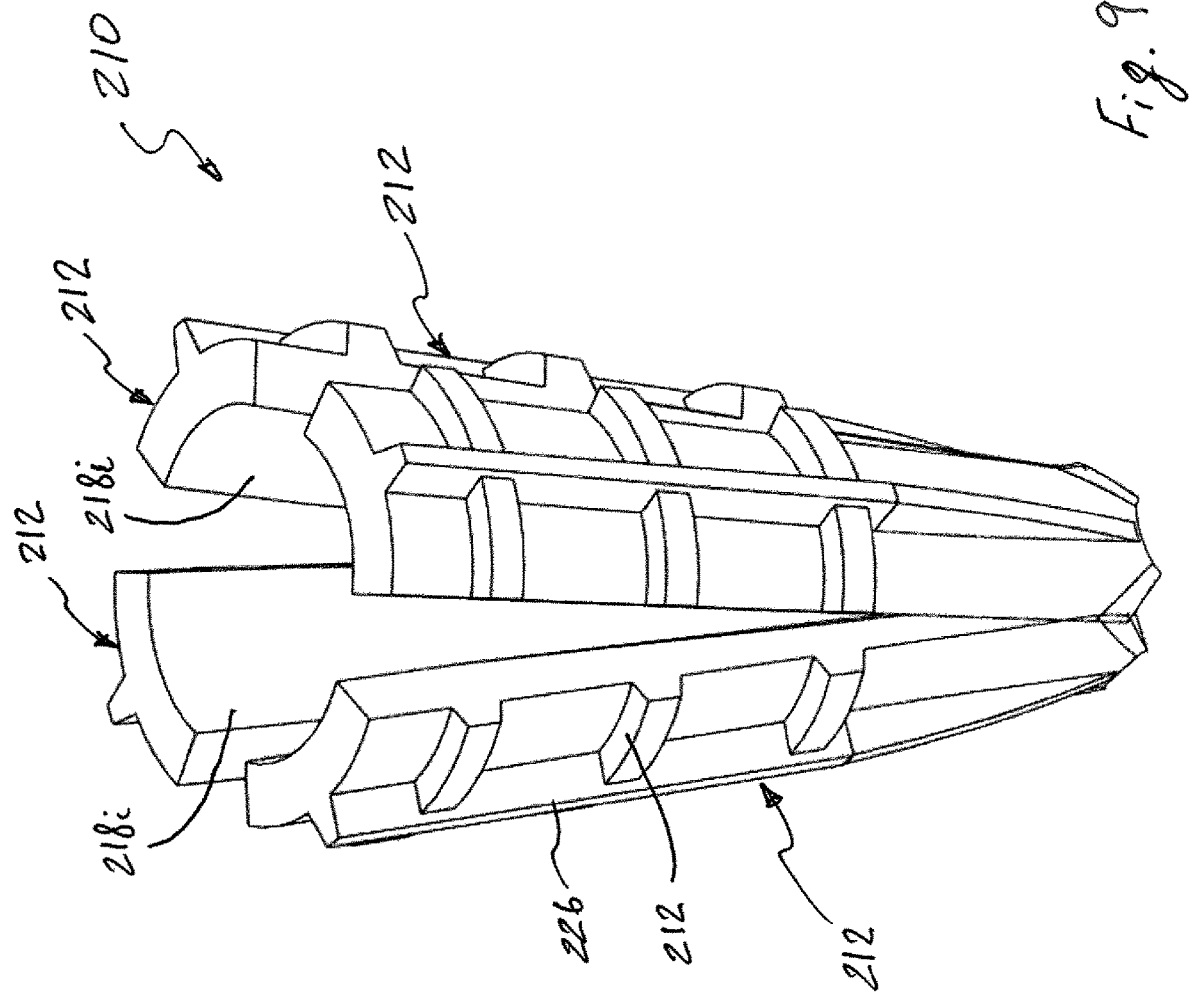
FIG. 9 is a perspective view from the top of a screw insert according to the third exemplary embodiment of the present invention in a folded configuration.

FIGS. 8 and 9 depict a screw insert 210 according to a third exemplary embodiment of the present invention. The screw insert 210 of the third exemplary embodiment includes four prongs 212 identical to the prongs 112 of the screw insert 110 of the second exemplary embodiment. The greater number of prongs 112 may be useful for larger diameter screw holes.

Figure 10:
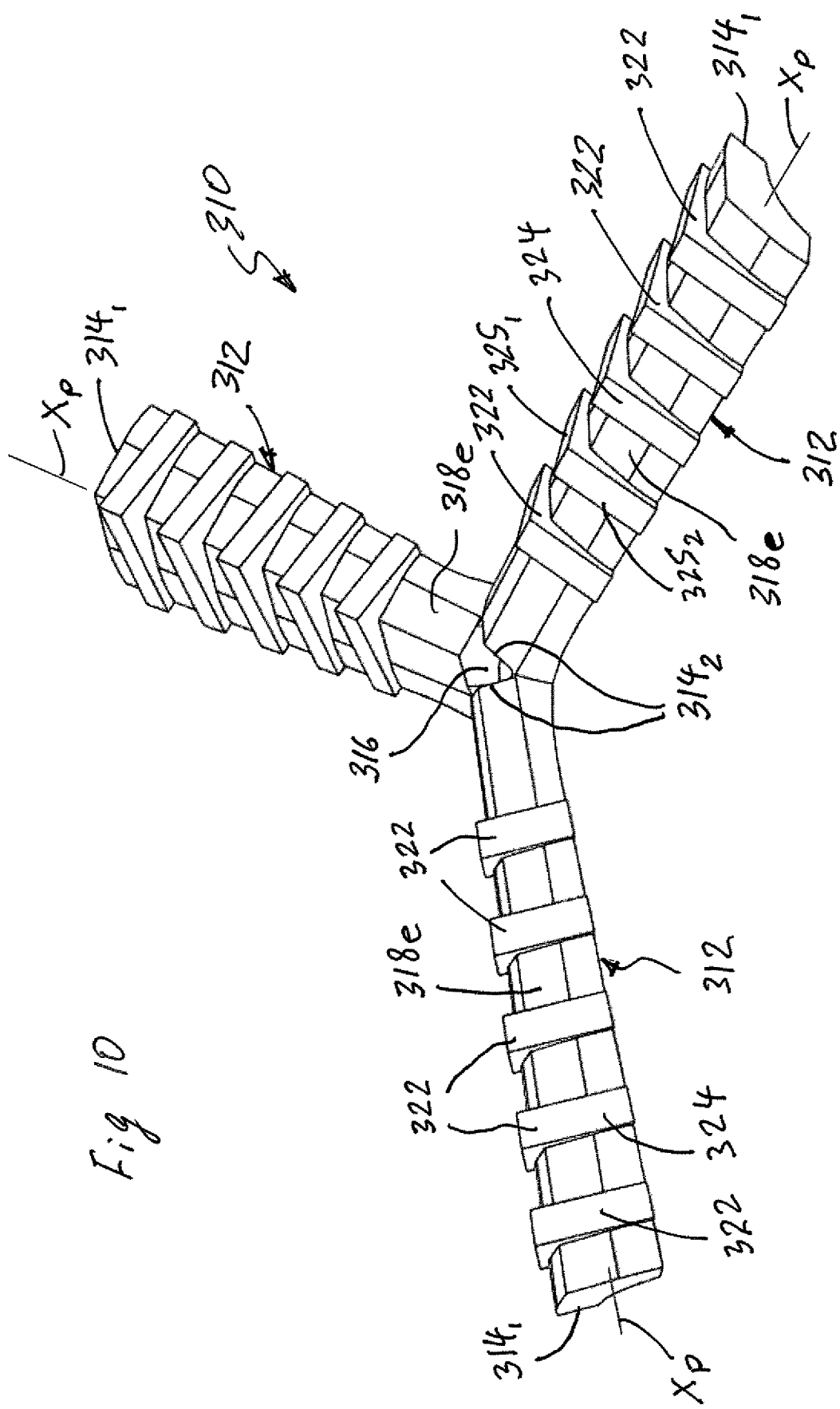
FIG. 10 is a perspective view from the top of a screw insert according to a fourth exemplary embodiment of the present invention in a flat configuration.
Figure 11:
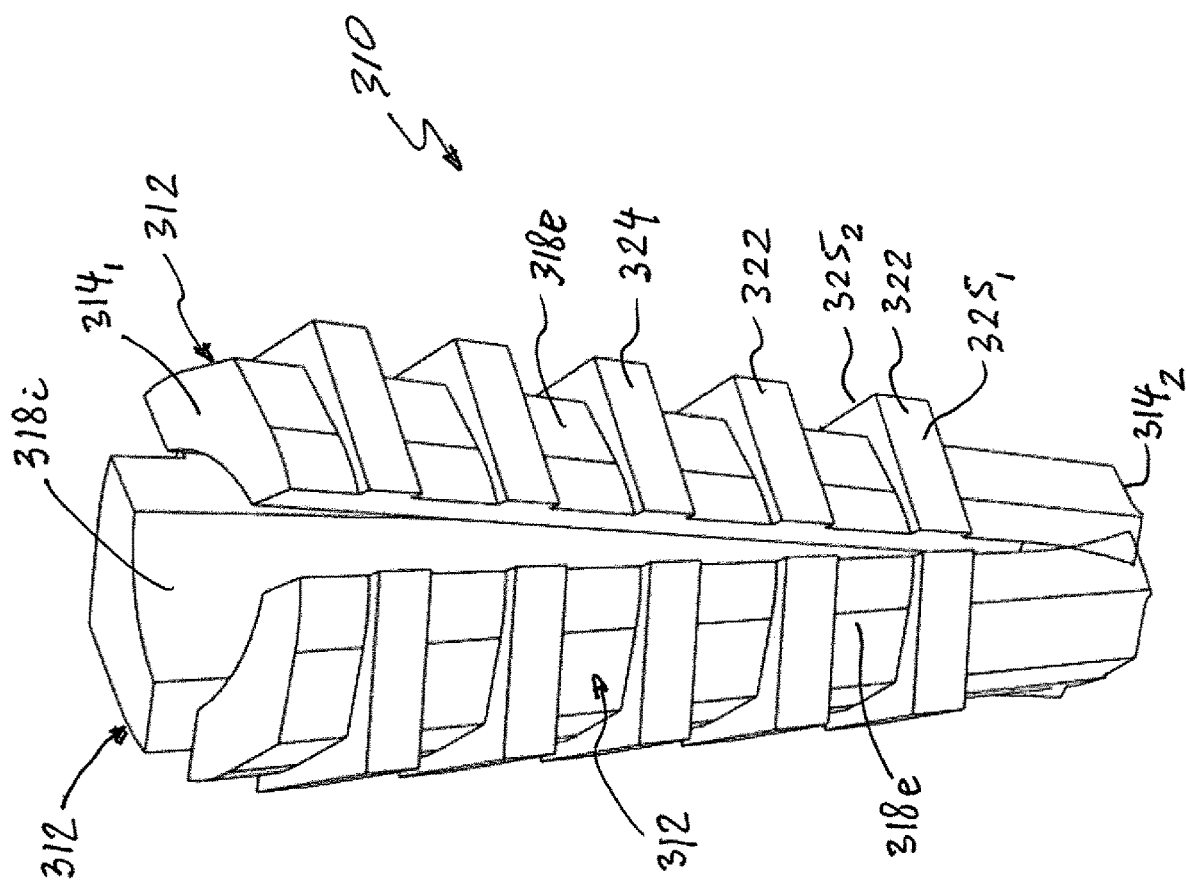
FIG. 11 is a perspective view from the top of a screw insert according to the fourth exemplary embodiment of the present invention in a folded configuration.

FIGS. 10 and 11 depict a screw insert 310 according to a fourth exemplary embodiment of the present invention. The screw insert 310 of the fourth exemplary embodiment includes three prongs 312, each integrally formed with a plurality of teeth 322 disposed in spaced relation along an outer surface 318e of each of the prongs 312 between a distal end $314_1$ and a proximal end $314_2$ of the prong 312. As best shown in FIGS. 10 and 11, an outer tooth surface 324 of each of the prongs 312 includes two side surfaces $325_1$ and $325_2$ oriented at an obtuse angle relative to one another. Also, each of the prongs 312 has a cylindrical inner surface 318i.

Figure 13A:
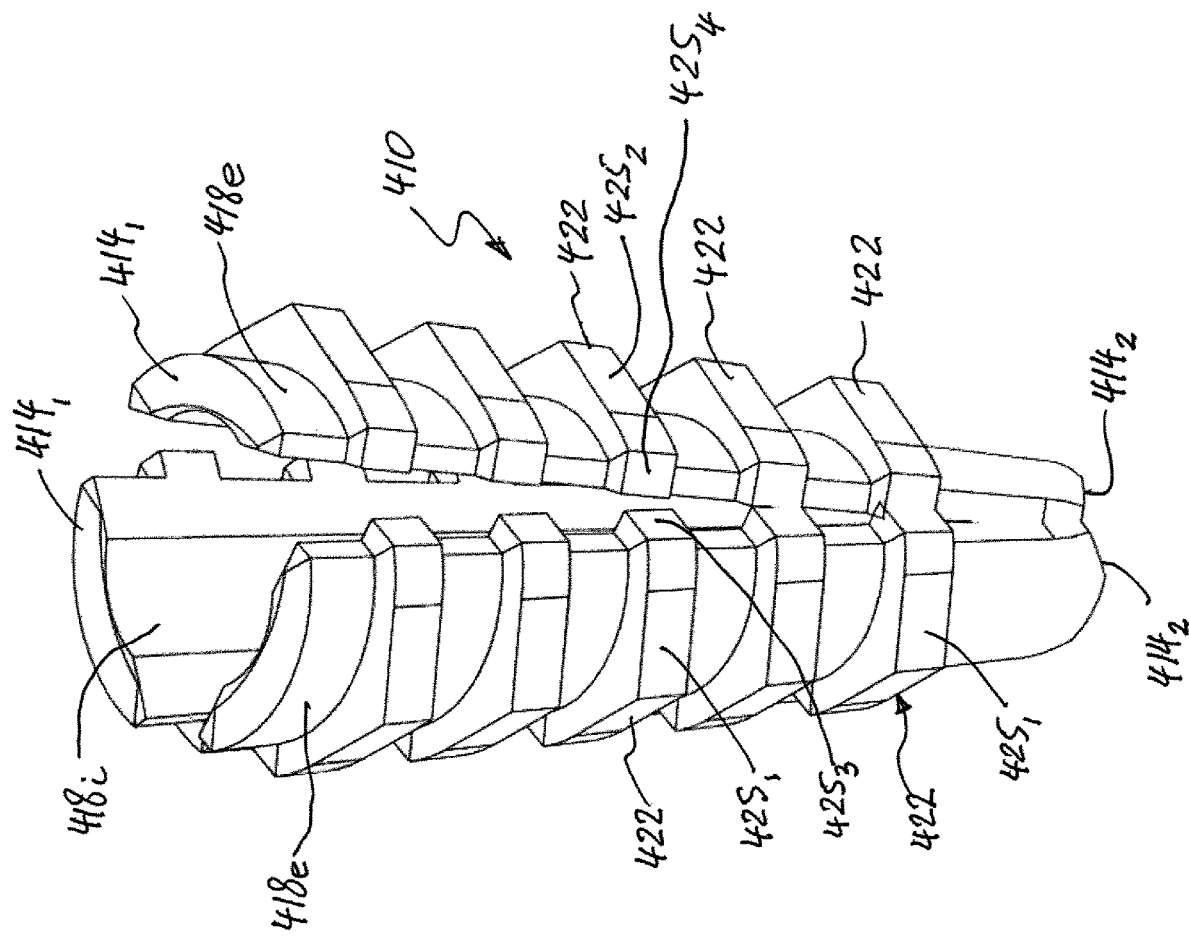
FIG. 13A is a perspective view from the top of the screw insert according to the fifth exemplary embodiment of the present invention in a folded configuration.

FIGS. 12A-13B depict a screw insert 410 according to a fifth exemplary embodiment of the present invention. The screw insert 410 of the fifth exemplary embodiment includes three prongs 412, each having a cylindrical outer surface 418e and a cylindrical inner surface 418i. Each of the prongs 412 is integrally formed with a plurality of teeth 422 disposed in spaced relation along the outer surface 418e of each of the prongs 412 between a distal end $414_1$ and a proximal end $414_2$ of the prong 412. As best shown in FIGS. 12A, 13A and 13B, an outer tooth surface 424 of each of the prongs 412 includes four side surfaces: first and second side surfaces $425_1$ and $425_2$ oriented at an obtuse angle relative to one another, a third side surface $425_3$ oriented at an obtuse angle relative to the first side surface $425_1$ and a fourth side surface $425_4$ oriented at an obtuse angle relative to the second side surface $425_2$.

The foregoing description of the exemplary embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A screw insert for repairing a stripped screw hole, the screw insert comprising three elongated prongs each having a distal end and a proximal end, the three elongated prongs are hingedly connected to each other only at the proximal ends thereof;
  the three elongated prongs are equiangularly spaced from each other so that longitudinal axes $X_P$ thereof are spaced apart;
  each of the prongs has an outer surface and an inner surface;
  the screw insert transformable from an open configuration to a folded configuration,
  the longitudinal axes of the prongs are coplanar in the open configuration; and
  the longitudinal axes of the prongs define an acute angle therebetween in the folded configuration,
  wherein each of the prongs is formed with a central longitudinal rib disposed on the outer surface thereof so as to extend between the distal and proximal ends of each prong along the longitudinal axes thereof.

2. The screw insert as defined in claim 1, wherein the proximal ends of the interconnected prongs define a through center opening therebetween.

3. The screw insert as defined in claim 1, wherein each of the prongs is formed with at least one tooth disposed on the outer surface thereof between the distal end and the proximal end of each of the prongs.

4. The screw insert as defined in claim 3, wherein the at least one tooth has a cylindrical outer tooth surface.

5. The screw insert as defined in claim 3, wherein each of the prongs is formed with a plurality of teeth disposed in spaced relation along the outer surface thereof, wherein each of the plurality of the teeth has an outer tooth surface oriented at an acute angle to the outer surface of the prong, and wherein the angle of the tooth adjacent to the proximal end of each of the prongs is larger than the angle of the tooth adjacent to the distal end of each of the prongs.

6. The screw insert as defined in claim 1, wherein the inner surface of each of the prongs is formed with at least one indentation.

7. The screw insert as defined in claim 6, wherein the at least one indentation is symmetrical to the longitudinal axis of each of the prongs and is formed in the shape of a triangular prism.

8. The screw insert as defined in claim 6, wherein the distal end of each of the prongs is formed with a recess open along the longitudinal axis in the direction away from the prong and closed along the longitudinal axis in the direction from the distal end toward the proximal end of the prong.

9. The screw insert as defined in claim 6, wherein the inner surface of each of the prongs is formed with a plurality of indentations spaced from each other along the longitudinal axis.

10. The screw insert as defined in claim 9, wherein the indentations are symmetrical to the longitudinal axis of each of the prongs and are formed in the shape of a triangular prism.

11. The screw insert as defined in claim 9, wherein the distal end of each of the prongs is formed with a recess open along the longitudinal axis in the direction away from the prong and closed along the longitudinal axis in the direction from the distal end toward the proximal end of the prong.

12. The screw insert as defined in claim 1, wherein each of the prongs has an external portion adjacent to the distal end of the prong and an inner portion adjacent to the associated proximal end, wherein the external portion has a trapezoidal shape with a width varying in the direction perpendicular to the longitudinal axis of the prong, and wherein the inner portion has a rectangular shape with a width constant in the direction perpendicular to the longitudinal axis of the prong.

13. The screw insert as defined in claim 12, wherein the width of the external portion at the distal end of a prong is larger than the width of the inner portion of the prong.

14. The screw insert as defined in claim 12, wherein the length of the external portion of each of the prongs in the direction of the longitudinal axis is larger than the length of the inner portion of each of the prongs in the direction of the longitudinal axis.

15. The screw insert as defined in claim 1, wherein each of the prongs has a cylindrical outer surface and a cylindrical inner surface.

\* \* \* \* \*